(12) United States Patent
Hosaka

(10) Patent No.: US 8,888,083 B2
(45) Date of Patent: Nov. 18, 2014

(54) MOVEMENT DEVICE HAVING LINEAR MOTOR

(75) Inventor: Akio Hosaka, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 13/984,032

(22) PCT Filed: Feb. 9, 2012

(86) PCT No.: PCT/JP2012/053021
§ 371 (c)(1),
(2), (4) Date: Aug. 7, 2013

(87) PCT Pub. No.: WO2012/108519
PCT Pub. Date: Aug. 16, 2012

(65) Prior Publication Data
US 2013/0320781 A1    Dec. 5, 2013

(30) Foreign Application Priority Data

Feb. 9, 2011 (JP) .................... 2011-025785

(51) Int. Cl.
| | | |
|---|---|---|
| *B25B 1/00* | (2006.01) | |
| *H02K 16/00* | (2006.01) | |
| *B23Q 11/00* | (2006.01) | |
| *B23Q 1/52* | (2006.01) | |
| *B23Q 1/62* | (2006.01) | |

(52) U.S. Cl.
CPC ............. *H02K 16/00* (2013.01); *B23Q 11/001* (2013.01); *B23Q 1/52* (2013.01); *B23Q 1/621* (2013.01)
USPC ............................................. 269/71; 269/55

(58) Field of Classification Search
CPC ......... B25B 13/28; B25B 13/505; B23Q 1/25
USPC .................................... 269/55, 71, 60, 289 R
See application file for complete search history.

(56) References Cited

U.S. PATENT DOCUMENTS

| | | | |
|---|---|---|---|
| 6,254,075 B1 * | 7/2001 | Kozima .......................... | 269/73 |
| 6,637,737 B1 * | 10/2003 | Beecherl et al. ................ | 269/71 |
| 6,887,125 B2 * | 5/2005 | Kurogouchi ...................... | 451/5 |
| 8,322,698 B2 * | 12/2012 | Bretschneider et al. ........ | 269/86 |
| 8,579,678 B2 * | 11/2013 | Omomoto ....................... | 451/41 |
| 2010/0164156 A1 * | 7/2010 | Bretschneider et al. ........ | 269/86 |
| 2013/0320781 A1 * | 12/2013 | Hosaka, Akio ............ | 310/12.13 |

FOREIGN PATENT DOCUMENTS

| | | |
|---|---|---|
| JP | 05-228761 | 9/1993 |
| JP | 2001-238485 | 8/2001 |
| JP | 2001-304332 | 10/2001 |

OTHER PUBLICATIONS

"International Search Report (Form PCT/ISA/210)", mailed on Apr. 17, 2012, with English translation thereof, p. 1-p. 4.

* cited by examiner

*Primary Examiner* — Lee D Wilson
(74) *Attorney, Agent, or Firm* — Jianq Chyun IP Office

(57) ABSTRACT

A movement device includes: a linear motor including a mover and a stator and moving a movement body including the mover in one axial direction; a rotational motor having a rotor and included in the movement body; and a control device. The rotation axis of the rotor passes through the center of gravity of the movement body and intersects a plane including the center of gravity and the path of movement of the mover. The control device controls the rotation of the rotor so that the counter rotational torque which compensates at least a part of rotational torque acting on the movement body due to the movement of the mover is generated in the rotor.

3 Claims, 5 Drawing Sheets

MOVEMENT DEVICE HAVING LINEAR MOTOR

CROSS-REFERENCE TO RELATED APPLICATION

This application is a 371 application of an international PCT application serial no. PCT/JP2012/053021, filed on Feb. 9, 2012, which claims the priority benefit of Japan application no. 2011-025785, filed on Feb. 9, 2011. The entirety of each of the above-mentioned patent applications is hereby incorporated by reference herein and made a part of this specification.

BACKGROUND

1. Technical Field

The invention generally relates to a movement device moving a movement body along one axis direction, and more particularly, to a movement device moving a movement body along one axis direction by a linear motor.

2. Description of Related Art

A movement device moving a movement body in one axis direction by a linear motor is well known in metal processing devices, transportation devices, inspection devices, measurement devices and semiconductor fabrication devices. Comparing the linear motor to a combination of a rotational motor and a ball screw, the linear motor is not influenced by, such as, unwanted back rush. Accordingly, the linear motor is effective on high speed movement and precise positioning.

If a thrust along the one axis direction acts on the movement body including a mover of the linear motor, a rotational torque acts on the movement body about an axis, in which the axis is perpendicular to a plane including the center of gravity and a path of movement of the mover, and passes through the center of gravity. With the unwanted rotational torque, attitude of the movement body that is moving may be deflected. Especially when the movement body has a large weight or a guide mechanism has a low rigidity, the guide mechanism may not adequately maintain the attitude of the movement body.

Prior art document 1 discloses a stage device, in which a pair of linear motors is horizontally arranged and a third linear motor is additionally arranged on a plane that has a height different from that of the pair of linear motors. Controlling the attitude of a movement body is possible by controlling the thrust generated from each of the linear motors. The additional linear motor for compensating an unwanted rotational torque may lead to a huge stage device.

Prior art document 2 discloses a stage device that comprises an X stage, a Y stage and a wafer stage. The Y stage is disposed on the X stage and is movable along an X direction by a pair of parallel linear motors. The wafer stage is disposed on the Y stage, and is movable along a Y direction by another pair of parallel linear motors. The thrust of each of the pair of parallel linear motors is determined based on a position of the center of gravity of the moving stage.

PRIOR ART DOCUMENTS

Patent Document

Patent Document 1: Japanese Laid-Open No. H05-228761
Patent Document 2: Japanese Laid-Open No. 2001-238485

SUMMARY

Accordingly, the disclosure is directed to a movement device that is not huge and is capable of controlling the attitude of a movement body in motion.

According to one embodiment, a movement device includes a linear motor comprising a mover and a stator, and moving a movement body that includes the mover in one axis direction; a rotational motor included in the movement body and including a rotor, wherein a rotational axis of the rotor passes through the center of gravity of the movement body, and intersects a plane including the center of gravity of the movement body and a path of movement of the mover; and a control device, controlling the rotation of the rotor so as to generate a counter rotational torque that compensates at least a part of a rotational torque that acts on the movement body due to the movement of the mover.

Herein, the "gravity of the movement body" refers not only to the strict center of gravity, for example, but to a range within a 100 mm distance from the strict center of gravity in a three dimensional space. The "path of movement of the mover" refers to a path of movement of a force point of the mover. And, the "rotational torque acting on the movement body" refers to a rotational torque that functions to rotate the movement body about a gravitational axis which is perpendicular to a plane including the center of gravity of the movement body and the path of movement of the mover and passes through the center of gravity of the movement body. Also, "at least a part of the rotational torque" includes rotational torques about axes, in which said axes are at least two components divided from the gravitational axis.

The linear motor moves the mover in the direction of a horizontal or vertical axis. The rotational axis of the rotor is perpendicular to a horizontal plane or a vertical plane. And, the rotational motor has the rotor equipped with an inertial wheel having a center of gravity that can be disposed on the rotational axis. Also, the movement device includes an acceleration detector detecting an acceleration of the mover. The control device controls an angular acceleration of the rotor of the rotational motor based on the acceleration detected by the acceleration detector.

According to this invention, the movement device is not bulky and a part of the rotational torque of the movement body is compensated by a counter rotational torque of the rotational motor.

DESCRIPTION OF THE EMBODIMENTS

Figure 1:
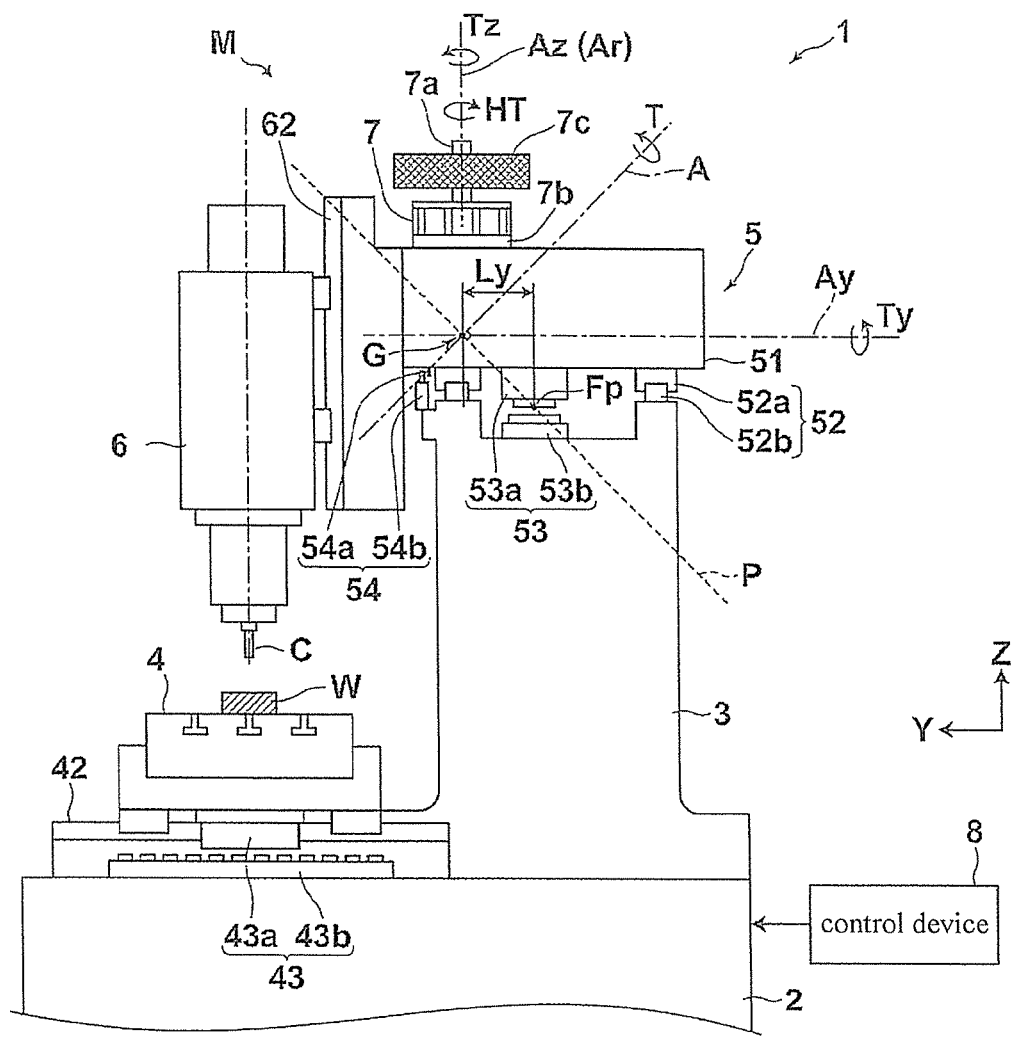
FIG. 1 is a side view of a processing device according to the first embodiment of the disclosure.
Figure 2:
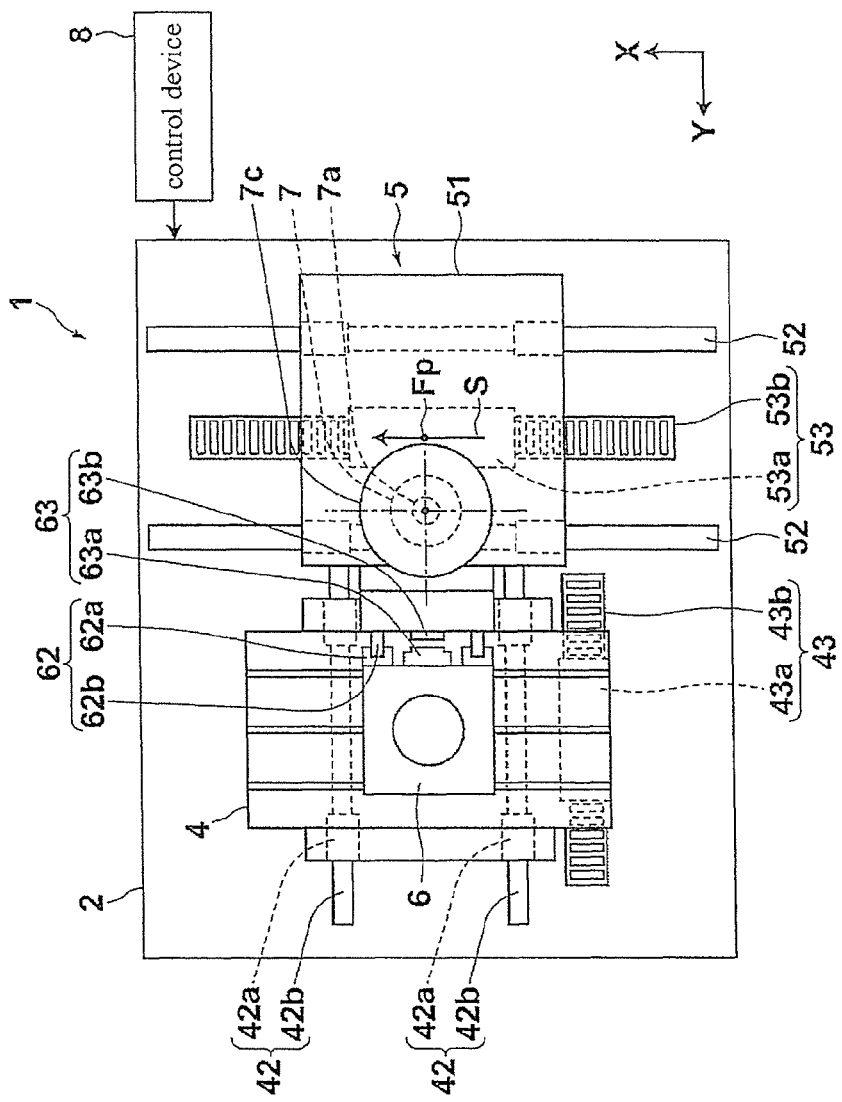
FIG. 2 is a plan view of the processing device in FIG. 1.
Figure 3:
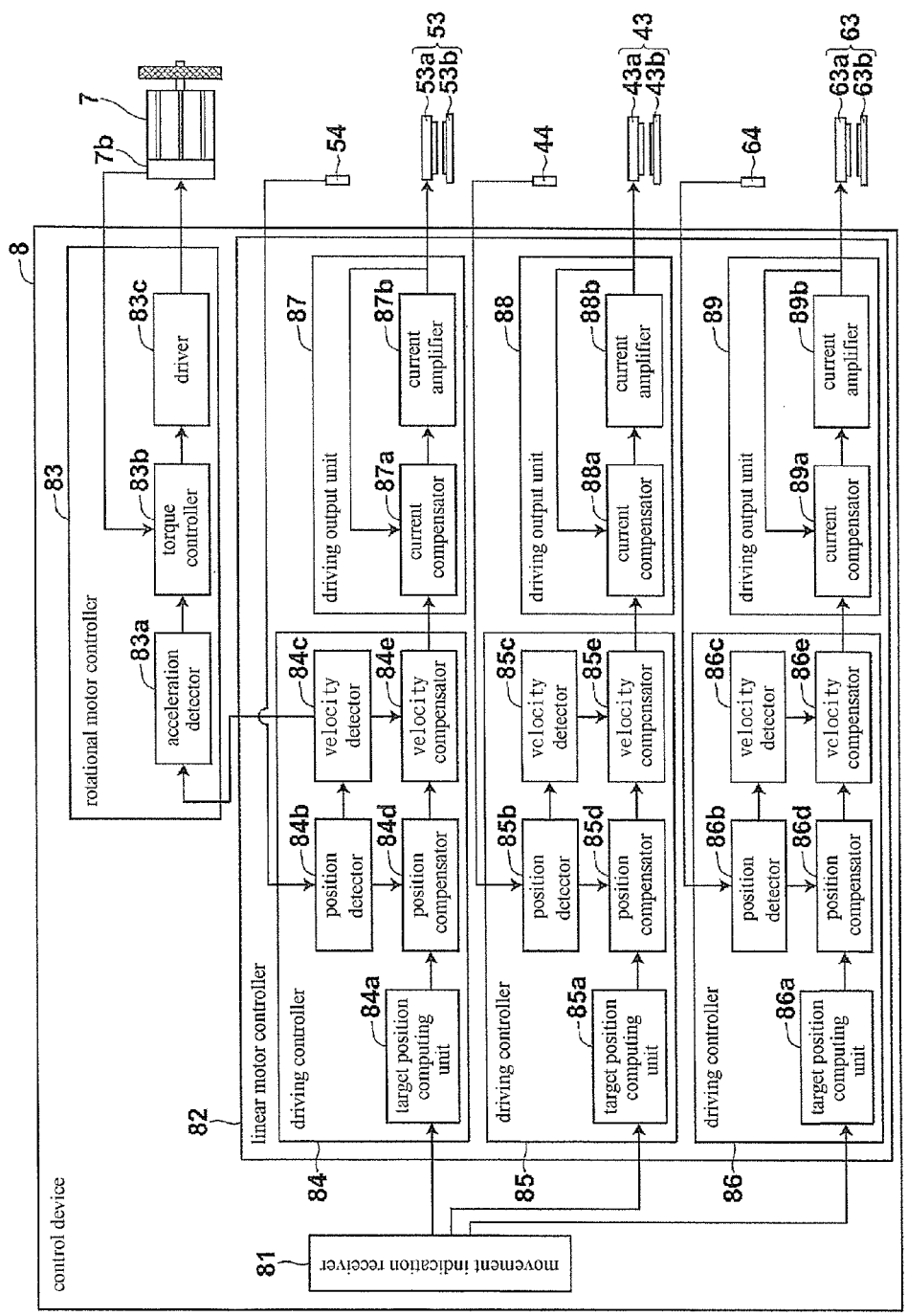
FIG. 3 is a block diagram of a control device in FIG. 1.

Referring to FIGS. 1 to 3, a processing device 1 is disclosed according to the first embodiment of the disclosure. The processing device 1 is a device that processes a workpiece W disposed on a table 4 using a rotational cutting tool C. The processing device 1 mainly includes a bed 2, a ram 3, the table 4, an X axis head 5, a Z axis head 6, a rotational motor 7 and control device 8.

The table 4 is disposed on the bed 2 and is movable along a Y-axis direction by a linear motor 43 and a guide mechanism 42. The linear motor 4 generates a thrust that moves the table 4 along the Y axial direction. The guide mechanism 42 guides movement of the table 4 along the Y-axis direction. The guide mechanism 42 includes a guide 42b and a slider 42a. The slider 42a is mounted to the table 4 and is movable on the guide 42b.

The linear motor 43 includes a mover 43a and a stator 43b. The mover 43a has a primary coil and the stator 43b has a row of secondary permanent magnets. The linear motor 43 magnetically excites the primary coil of the mover 43a and provides a thrust to the mover 43a. A path of movement S of the mover 43a is shown in FIG. 2.

The ram 3 is disposed to vertically stand on the bed 2. The X axis head 5 is disposed on the ram 3 and is movable along an X-axis direction by a linear motor 53 and a guide mechanism 52. The linear motor 53 generates a thrust that moves the X axis head along the X-axis direction. The linear motor 53 includes a mover 53a and a stator 53b. The mover 53a is mounted to the X axis head 5, and the stator 53b is mounted to the ram 3. The mover 53a has a primary coil and the stator 53b has a row of secondary permanent magnets. The guide mechanism 52 includes a guide 52b and a slider 52a. The guide 52b is mounted to the ram 3. The slider 52a is mounted to the X axis head 5, and is movable on the guide 52b.

The linear motor 53 includes a linear scale 54 having a light sensor 54a and a scale 54b. The light sensor 54a is mounted to the X-axis head 5. The scale 54b is mounted to the ram 3, and extending in parallel with the stator 53b. By reading the graduation on the scale 54b using the light sensor 54a, the linear motor 53 can output position information of the mover 53a. Alternatively, the linear motor 53 can output position information by reading a magnetic scale using a magnetic sensor, such as a Hall element.

The Z axis head 6 is disposed in front of the X axis head 5 by a linear motor 63 and a guide mechanism 62. The linear motor 63 generates a thrust to move the Z axis head 6 along a Z-axis direction. The linear motor 63 includes a mover 63a and a stator 63b. The guide mechanism 62 has the same structure as the guide mechanism 42. The linear motor 63 has the same structure as the linear motor 43. The linear motor 63 and the linear motor 43 respectively have a linear scale 64 and a linear scale 44 the same as those of the linear motor 53.

The rotational cutting tool C is mounted to a lower end of the Z axis head 6. By driving the linear motors 43, 53 and 63, the processing device 1 can use the rotational cutting tool C to process the workpiece W in three dimensions.

A rotational torque T acting on the processing device 1 is described as follows as in a case that the linear motor 53 is driven. Herein, a movement body M includes the Z-axis head 6, the linear motor 63, the guide mechanism 62, the X-axis head 5, the rotational motor 7, the slider 52a and the mover 53a.

If the movement body M is moved along the X-axis direction into a paper surface in FIG. 1, by the action of the thrust Fw of the mover 53a, the rotational torque T acts on the movement body M about a gravitational axis A which passes through the center of gravity G of the movement body M and is perpendicular to a plane P including a path S of movement of the mover 53a and the center of gravity G. Herein, a force point Fp where the rotational torque T is generated is set at a central position of a bottom surface of the mover 53a.

The rotational torque T is dividable into a rotational torque Tz and a rotational torque Ty. The rotational torque Tz acts about a gravitational axis Az that passes through the center of gravity G and extends along Z-axis direction. The rotational torque Tz acts about a gravitational axis Ay that passes through the center of gravity G and extends along Y-axis direction. Also, in this embodiment, as shown in FIG. 2, a position of an X-axis direction of the force point Fp is consistent with that of the center of gravity G. Accordingly, a rotational torque Tx about a gravitational axis Ax that passes through the center of gravity G and extends along the X-axis direction, does not act on the movement body M.

Thus, by the action of the rotational torques Ty and Tz, the movement body M that is moving along the X-axis direction deflects to a pitching direction and a yawing direction. When weight of the movement body M is large, suppressing the deflection to the pitching direction and the yawing direction only by the guide mechanism 52 is difficult.

The rotational motor 7 includes a rotor 7a and an inertia wheel 7c mounted to the rotor 7a. The rotational motor 7 is secured to the upper part of the X axis head 5 so that the rotational axis Ar of the rotor 7a is consistent with the gravitational axis Az. A center of gravity of the inertial wheel 7c lies on the rotational axis Ar. The rotational motor 7 is mounted to suppress the deflection in the yawing direction of the movement body M and control the attitude of the movement body M. The rotational motor 7 is a servo motor and includes an encoder 7b.

The rotational motor 7 generates a counter rotational torque HT by rotating the rotor 7a and the inertial wheel 7c so as to compensate the rotational torque Tz. The counter rotational torque HT has the same magnitude as the rotational torque Tz but has an opposite direction thereto.

Referring to FIG. 3, a control device 8 is described as follows. The control device 8 controls the linear motors 43, 53 and 63 and the rotational motor 7. The control device 8 includes a movement indication receiver 81, a linear motor controller 82 and a rotational motor controller 83.

The movement indication receiver 81 receives a movement indication from a user through an operation panel and outputs a movement instruction to the linear motor controller 82 based on the movement indication. The linear motor controller 82 controls the linear motors 43, 53 and 63, and includes drive controllers 84, 85 and 86 and driving output units 87, 88 and 89.

The drive controllers 84, 85 and 86 generates an instruction value to the linear motors 53, 43 and 63 based on the movement instruction and the position information. The drive controllers 84, 85 and 86 includes target position computing units 84a, 85a and 86a, position detectors 84b, 85b and 86b, velocity detectors 84c, 85c and 86c, position compensators 84d, 85d and 86d and velocity compensators 84e, 85e and 86e, respectively.

The target position computing units 84a, 85a and 86a compute target positions per unit time based on the movement instruction. The target positions are respectively provided to the position compensators 84d, 85d, 86d. The unit time is determined by computation speed of the linear motor controller 82. The position detectors 84b, 85b and 86b detect positions of the movers 53a, 43a, 63a based on information from the linear scales 54, 44 and 64. The detected positions are respectively provided to the position compensators 84d, 85d and 86d.

The velocity detector 84c, 85c and 86c receive position information per unit time from the position detectors 84b, 85b and 86b and detects velocities of the movers 43a, 53a and 63a. The detected velocities are respectively provided to the velocity compensators 84e, 85e and 86e. The detected velocity of the velocity detector 84c is provided to an acceleration detector 83a. The position compensators 84d, 85d and 86d provide the target velocities, which are obtained by giving gains to differences between target positions and detected positions, to the velocity compensators 84e, 85e and 86e. The velocity compensators 84e, 85e. 86e provide the target currents, which are obtained by giving gains to differences between target velocities and detected velocities, to the driving output units 87, 88 and 89.

The driving output units 87, 88 and 89 provide driving currents to the linear motors 53, 43 and 63, respectively, based on the target currents. The driving output units 87, 88 and 89 respectively include current compensators 87a, 88a and 89a and current amplifiers 87b, 88b and 89b. The driving currents of the current amplifiers 87b, 88b and 89b are fedback to the current compensators 87a, 88a and 89a. The current compensators 87a, 88a and 89a provide current instructions to the current amplifiers 87b, 88b and 89b based on the target currents and the driving currents. The current amplifiers 87b, 88b and 89b receive the current instructions from the current compensators 87a, 88a and 89a and provide the driving currents to the linear motors 43, 53 and 63, respectively.

The rotational motor controller 83 controls the torque of the rotational motor 7. The rotational motor controller 83 includes an acceleration detector 83a, a torque controller 83b and a driver 83c. The acceleration detector 83a receives the detected velocity from the velocity detector 84c per unit time and detects an acceleration of the mover 53a. A detected acceleration β is provided to the torque controller 83b. The torque controller 83b receives the detected acceleration β from the acceleration detector 83a and calculates a target angular acceleration α of the rotor 7a. The target angular acceleration α is provided to the driver 83c.

The calculation of the target angular acceleration α is described as follows. Here, if the mass of the mover 53a is set as m, the thrust Fw of the linear motor 53 is presented by Formula (1).

$$Fw = m \times \beta \qquad \text{Formula (1)}$$

A coefficient for computing a rotational torque around the gravitational axis Az from the thrust Fw is set as Kz. A distance between the force point Fp of the linear motor 53 and the center of gravity in the Y-axis direction is set as Ly. The rotational torque Tz around the gravitational axis Az is presented by Formula (2). The coefficient Kz specifically ranges about from 0.2 to 0.5.

$$Tz = Kz \times Fw \times Ly = Kz \times m \times \beta \times Ly \qquad \text{Formula (2)}$$

Inertia moments of the rotor 7a and the inertial wheel 7c are respectively set as Ia and Ib. A counter rotational torque HT generated by the rotational motor 7 is presented by Formula (3).

$$HT = (Ia + Ib) \times \alpha \qquad \text{Formula (3)}$$

To compensate the torque Tz with the counter rotational torque HT, Formula (4) should be satisfied.

$$(Ia + Ib) \times \alpha = Kz \times m \times \beta \times L \qquad \text{Formula (4)}$$

The target angular acceleration α is presented by Formula (5).

$$\alpha = Kz \times m \times \beta \times L / (Ia + Ib) \qquad \text{Formula (5)}$$

The target angular acceleration α has a direction opposite to that of the rotational torque Tz. The driver 83c receives the target angular acceleration α from the torque controller 83b and controls the angular acceleration of the rotor 7a of the rotational motor 7.

Next, the action of the processing device 1, when only the linear motor 53 is driven, is described as follows. The movement indication receiver 81 outputs a movement indication of the X direction to the drive controller 84 when receiving the movement indication of the X direction from a user. The drive controller 84 calculates a target position and outputs a target velocity based on the position information from the linear scale 54. The driving output unit 87 receives the target velocity and outputs a driving current.

The mover 53a of the linear motor 53 generates a thrust Fw in the X-axis direction. The movement body M is guided by the guide mechanism 52 to move in the X-axis direction, and is deflected to the yawing direction by the rotational torque Tz around the gravitational axis Az.

The rotational motor controller 83 detects the acceleration β of the mover 53a, calculates the target angular acceleration β based on the detected acceleration α and controls the angular acceleration of the rotor 7a. The rotational motor 7 generates the counter rotational torque HT, suppresses the deflection in the yawing direction of the movement body M, and controls the attitude of the movement body M.

According to the first embodiment, the rotational motor 7 is secured to the X-axis head 5 so that the rotational axis Ar is consistent with the gravitational axis Az. And, the angular acceleration of the rotor 7a is controlled so as to generate the counter rotational torque HT that compensates the rotational torque Tz. In this way, the deflection in the yawing direction of the movement body M is prevented. Besides, it is not necessary to provide an additional linear motor to compensate the rotational torque Tz, and the processing device 1 is prevented from being large.

In order to compensate the rotational torque Ty, an additional motor may be secured to the X-axis head 5 in a manner that the rotational axis of the additional motor is consistent with the gravitational axis Ay. Alternatively, one rotational motor, which is secured to the X-axis head 5 in a manner that the rotational axis is consistent with the gravitational axis A, may generate a counter rotational torque that compensates the rotational torque T. If the gravitational axis A intersects the plane P, the gravitational axis A is not limited to be divided into gravitational axis Ay being perpendicular to the vertical plane and gravitational axis Az perpendicular to the horizontal plane.

Figure 4:
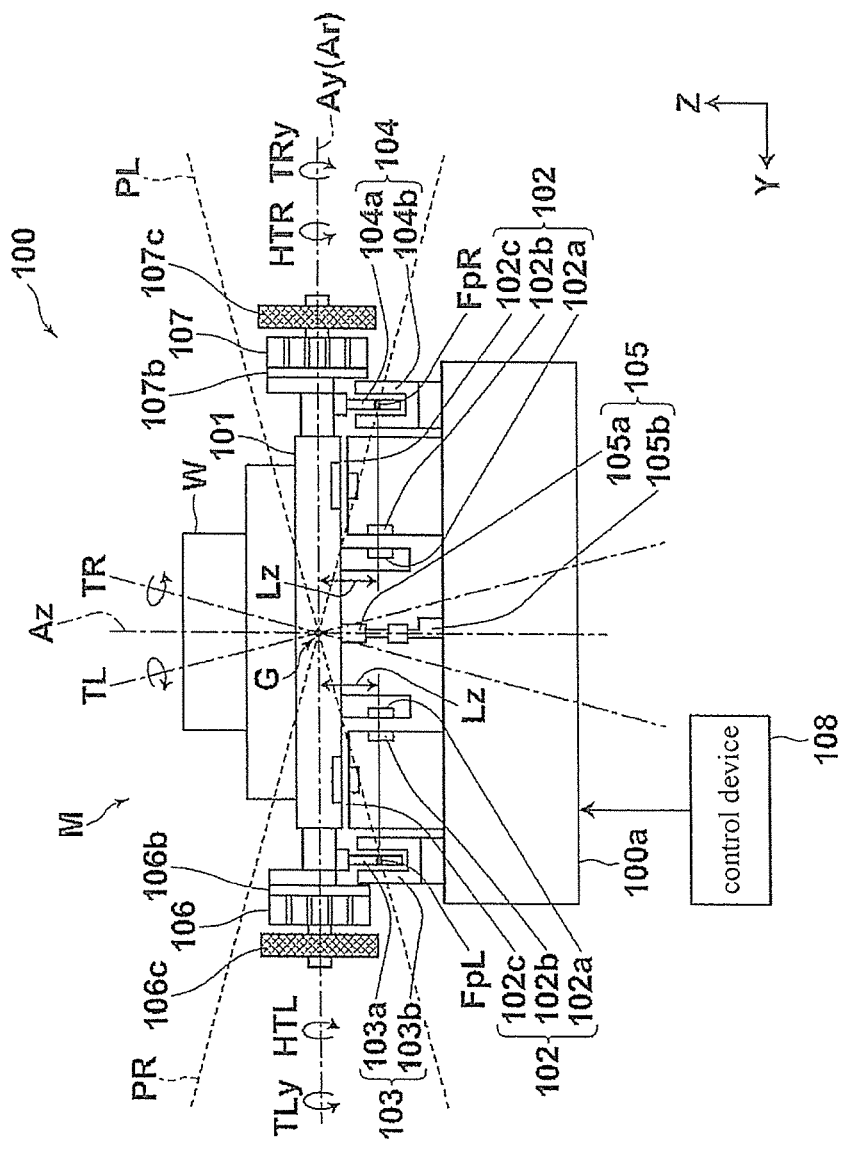
FIG. 4 is a front view of a stage device according to the second embodiment of the disclosure.
Figure 5:
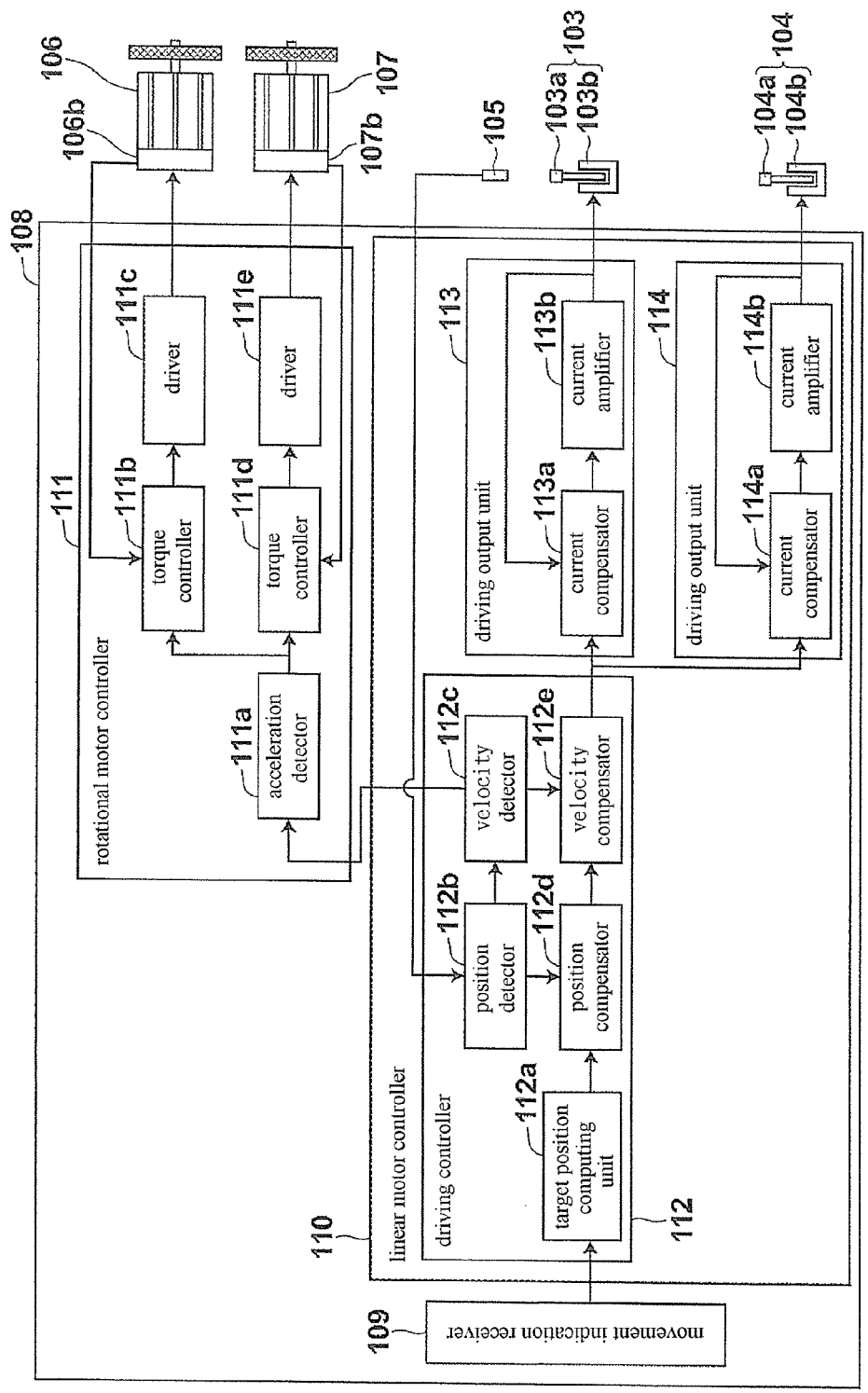
FIG. 5 is a block diagram of a control device in FIG. 4.

Referring to FIG. 4, a stage device 100 according to the second embodiment of the disclosure is described as follows. The stage device 100 is a device that moves a workpiece W disposed on a stage 101 in an X-axis direction. The stage device 100 includes a bed 100a, a stage 101, a guide mechanism 102, linear motors 103 and 104, a linear scale 105, rotational motors 106 and 107 and a control device 108.

The guide mechanism 102 guides the movement of the stage 101 in the X-axis direction. The guide mechanism 102 has hydrostatic bearings to determine the precise positioning. The hydrostatic bearings can obviously lower the frictional resistance of a guide surface and the influence on the positioning accuracy due to tiny fluctuation on the guide surface is avoidable.

The guide mechanism 102 includes guide blocks 102a, 102a, guide rails 102b, 102b and fluid bearings 102c, 102c. The guide blocks 102a, 102a are mounted to a bottom surface of the stage 101. The guide rails 102b, 102b are mounted to a top surface of the bed 100a. Since a pair of the guide blocks 102a, 102a and a pair of the guide rails 102b, 102b are installed, the stage 101 is firmly guided in the X-axis direction.

The fluid bearings 102c, 102c are formed in the gaps between the stage 101 and the guide rails 102b, 102b, and in the gaps between the guide blocks 102a, 102a and the guide rails 102b, 102b. The fluid bearings 102c, 102c are conventional hydrostatic bearings using pressurized fluid.

A pair of linear motors 103, 104 is disposed to move the stage 101 in the X-axis direction. The linear motors 103, 104 include coreless linear motors. The linear motors 103, 104 include movers 103a, 104a as primary coils and stators 103b, 104b as secondary permanent magnets. A pair of U-shaped stators 103b, 104b is mounted on a top surface of the bed 100a. The movers 103a, 104a are mounted to the stage 101 in a manner that the movers 103a, 104a are inserted into the stators 103b, 104b with a predetermined gap. The linear scale 105 is disposed to detect a position of the stage 101.

Rotational torques TL, TR acting on the stage device 100 when the linear motors 103, 104 are driven are described as follows. Here, the movement body M includes the stage 101, the rotational motors 106, 107, the guide blocks 102a and the movers 103a, 104a.

If the movement body M is moved in the X-axis direction, a rotational torque TL acts on the movement body M around a gravitational axis AL that passes through a center of gravity G of the movement body M and is perpendicular to a plane including a path of movement of the force point FpL of the mover 103a and the center of gravity G. Besides, the rotational torque TR acts on the movement body M around a gravitational axis AR that passes through the center of gravity G of the movement body M and is perpendicular to a plane including a path of movement of a force point FpR of the mover 104a and the center of gravity G.

The rotational torque TL is divided into a rotational torque TLz and a rotational torque TLy, wherein the rotational torque TLz functions about a gravitational axis Az that passes through the center of gravity G in the Z-axis direction, and the rotational torque TLy functions about a gravitational axis Ay that passes through the center of gravity G in the Y-axis direction. Similarly, the rotational torque TR is divided into a rotational torque TRz and a rotational torque TRy, wherein the rotational torque TRz acts about the gravitational axis Az, and the rotational torque TRy acts about the gravitational axis Ay. In the second embodiment, positions of the force points FpL, FpR are consistent with the position of the center of gravity G in the X-axis direction. Thus, the rotational torques TLx, TRx that act about the gravitational axis Ax passing through center of gravity G in the X-axis direction does not act on the movement body M. Also, since the linear motors 102, 103 generate the same thrusts Fw, the rotational torques TLz, TRz compensate each other. That is, the rotational torques TLy, TRy act on the movement body M, and the movement body M deflects to a pitching direction. The guide mechanism 102 having hydrostatic bearings has a low rigidity, and it is difficult to suppress the deflection in the pitching direction only by the guide mechanism 102.

The rotational motors 106, 107 are respectively secured to left and right sides of the stage 101, and suppress the deflection in the pitching direction of the movement body M and control the attitude of the movement body M. The rotational axes ArL, ArR of the rotational motors 106, 107 are made to be consistent with the gravitational axis Ay. The rotational motors 106, 107 have structures the same as those of the rotational motor 7 in the first embodiment.

The inertia moments of the rotors 106a, 107a are set as Ia, and the inertia moments of the inertial wheels 106c, 107c are set as Ib, and counter rotational torques HTL, HTR generated by the rotational motors 106, 107 are presented by Formula (8) and Formula (9).

$$HTL=(Ia+Ib)\times \alpha L \qquad \text{Formula (8)}$$

$$HTR=(Ia+Ib)\times \alpha R \qquad \text{Formula (9)}$$

To compensate the rotational torques TLy, TRy by the counter rotational torques HTL, HTR, Formula (10), (11) are satisfied.

$$(Ia+Ib)\times \alpha L=Ky\times m\times \beta \times Lz \qquad \text{Formula (10)}$$

$$(Ia+Ib)\times \alpha R=Ky\times m\times \beta \times Lz \qquad \text{Formula (II)}$$

By this, the target angular accelerations αL, αR are presented by Formula (12), (13).

$$\alpha L=Ky\times m\times \beta \times Lz/(Ia+Ib) \qquad \text{Formula (12)}$$

$$\alpha R=Ky\times m\times \beta \times Lz/(Ia+Ib) \qquad \text{Formula (13)}$$

The directions of the target angular accelerations αL, αR are respectively opposite to the rotational torgues TLy, TRy.

Next, actions of the stage device 100 are described as follows. Same as the first embodiment, if a movement indication receiver 109 receives a movement indication from a user, the movement indication receiver 109 outputs the movement indication to a drive controller 112. The drive controller 112 calculates target positions and outputs target velocities based on the position information from the linear scale 105. Driving output units 113 and 114 receive the target velocities and output driving currents to the linear motors 103 and 104.

The linear motors 103, 104 generate thrusts FwL, FwR in the X-axis direction. The movement body M is guided by the guide mechanism 102 to move in the X-axis direction, and is deflected to the pitching direction by the rotational torques TLy, TRy around the gravitational axis Ay.

A rotational motor controller 111 detects an acceleration of the movement body M, and calculates the target angular accelerations αL, αR based on the detected acceleration β. Angular accelerations of the rotors of the rotational motors 106, 107 are controlled based on the target angular accelerations αL, αR. The rotational motors 106, 107 generate the counter rotational torques HTL, HTR to suppress the deflection in the pitching direction of the movement body M.

According to the second embodiment, the rotational motors 106, 107 are secured in a manner that the rotational axes ArL, ArR are consistent with the gravitational axis Ay. And, the rotational motors 106, 107 are controlled to generate the counter rotational torques HTL, HTR for compensating the rotational toques TLy, TRy. In this way, the deflection in the pitching direction of the movement body M is suppressed. Besides, since no additional linear motor to compensate the rotational torques TLy, TRy is required, the size of the stage device 100 is prevented from becoming large.

In the first and second embodiments, the movement body M including the rotational motors moves in a horizontal axis direction, but the moving direction is not limited. Of course, the movement body M can move in a vertical axis direction, and may move in any axis direction in a three dimensional space. The rotational motor may be arranged in a manner that its rotational axis passes through the center of gravity of the movement body M and intersects a plane including the center of gravity and path of movement of the mover. Rotation of the rotational motor may be controlled so as to compensate at least a part of the rotational torque T acting on the movement body M.

In addition, in the first and second embodiment, although the rotational motors have inertial wheels, the inertial wheels are not necessary. When the inertia moments of the rotors are large, the inertial wheels are not required. Besides, the number of the rotational motors is not limited to that disclosed in the embodiments.

What is claimed is:

1. A movement device, comprising:
   a linear motor including a mover and a stator, to move a movement body that includes the mover in one axis direction;
   a rotational motor, included in the movement body and including a rotor, wherein a rotational axis of the rotor passes through a center of gravity of the movement body, and intersects a plane including the center of gravity and a path of movement of the mover; and a control device, controlling a rotation of the rotor so as to generate a counter rotational torque that compensates at least a part of a rotational torque that acts on the movement body due to a movement of the mover, wherein the linear motor moves the mover in a horizontal axis direction or in a vertical axis direction, and the rotational axis of the rotor is perpendicular to a horizontal plane or a vertical plane.

2. The movement device as claimed in claim 1, wherein the rotational motor has the rotor equipped with an inertial wheel, and a center of gravity of the inertial wheel lies on the rotational axis of the rotor.

3. The movement device as claimed in claim 1, further comprising an acceleration detector detecting an acceleration of the mover, wherein the control device controls an angular acceleration of the rotor based on the acceleration detected by the acceleration detector.

* * * * *